US012202249B2

(12) United States Patent
Seemann et al.

(10) Patent No.: US 12,202,249 B2
(45) Date of Patent: Jan. 21, 2025

(54) ADJUSTING A LATERAL POSITION OF A TRANSFER BLANKET

(71) Applicant: Hewlett-Packard Development Company, L.P., Spring, TX (US)

(72) Inventors: Ziv Seemann, Ness Ziona (IL); Avi Barazani, Ness Ziona (IL); Israel Katz, Ness Ziona (IL)

(73) Assignee: HEWLETT-PACKARD DEVELOPMENT COMPANY, L.P., Spring, TX (US)

(*) Notice: Subject to any disclaimer, the term of this patent is extended or adjusted under 35 U.S.C. 154(b) by 0 days.

(21) Appl. No.: 17/773,973

(22) PCT Filed: Nov. 18, 2019

(86) PCT No.: PCT/US2019/061982

§ 371 (c)(1),
(2) Date: May 3, 2022

(87) PCT Pub. No.: WO2021/101504

PCT Pub. Date: May 27, 2021

(65) Prior Publication Data

US 2022/0371318 A1 Nov. 24, 2022

(51) Int. Cl.
*B41F 30/06* (2006.01)
*B41F 7/02* (2006.01)

(52) U.S. Cl.
CPC ................ *B41F 30/06* (2013.01); *B41F 7/02* (2013.01)

(58) Field of Classification Search
None
See application file for complete search history.

(56) References Cited

U.S. PATENT DOCUMENTS

| | | | | |
|---|---|---|---|---|
| 4,817,525 | A | 4/1989 | Yagi | |
| 5,911,304 | A * | 6/1999 | Cumberlege | B65G 39/071 198/806 |
| 6,104,899 | A | 8/2000 | Hokari et al. | |
| 2011/0103815 | A1 | 5/2011 | Hanashi | |
| 2013/0064581 | A1 | 3/2013 | Okamoto et al. | |
| 2018/0196376 | A1* | 7/2018 | Mizuno | G03G 15/1615 |

FOREIGN PATENT DOCUMENTS

| | | | |
|---|---|---|---|
| CN | 2495616 | Y | 6/2002 |
| DE | 102004043681 | A1 | 3/2006 |
| DE | 102009042625 | A1 | 4/2010 |
| DE | 102008043908 | A1 | 6/2010 |
| DE | 102012205527 | A1 | 10/2012 |
| JP | 5879080 | B2 | 3/2016 |
| JP | 2019-061139 | A | 4/2019 |

* cited by examiner

*Primary Examiner* — Joshua D Zimmerman
(74) *Attorney, Agent, or Firm* — Jordan IP Law, LLC

(57) ABSTRACT

According to aspects of the present disclosure there are provided methods and apparatus for providing selective control of a lateral position of a transfer blanket, the method comprising providing a crowned pulley rotating about an axis of a shaft, supporting a transfer blanket on the crowned pulley, the crowned pulley providing a self-tracking effect on a lateral position of the transfer blanket, and selectively controlling a lateral position of the crowned pulley along the axis of the shaft.

5 Claims, 6 Drawing Sheets

ADJUSTING A LATERAL POSITION OF A TRANSFER BLANKET

BACKGROUND

Offset printing is a printing technique whereby an inked image is transferred from a plate cylinder to a transfer blanket and then to a print medium. The technique is typically used when a large number of repeat prints are desired, such as for a magazine or newspaper.

Offset printing is a useful technique for monochrome printing for repeated prints comprising a single color. Broadsheets and other single colored prints are regularly printed using an offset printing device.

For color printing, individual colors may be transferred to the transfer blanket as the blanket passes through the printing system, creating a build up to the final print with each individual color added. After all colors are added to the transfer blanket, the final print can be impressed onto the print medium. The transfer blanket may be in a continuous loop such that it is then fed back into the printing system and plate cylinders to receive the colors for the next impression.

BRIEF INTRODUCTION OF THE DRAWINGS

Various features of the present disclosure will be apparent from the detailed description which follows, taken in conjunction with the accompanying drawings, which together illustrate features of the present disclosure, and wherein.

Figure 1:
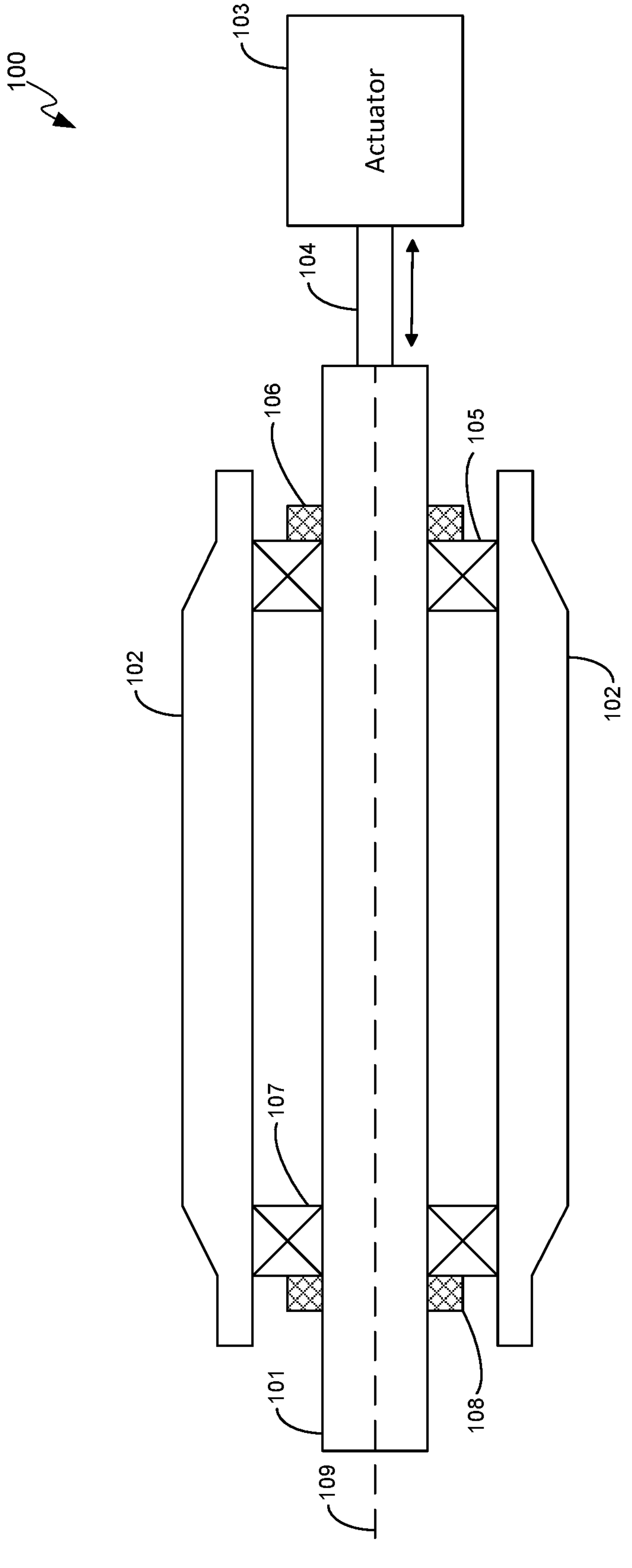
FIG. 1 illustrates a system to provide selective control of a transfer blanket in an offset printing device according to examples of the disclosure.
Figure 3A:
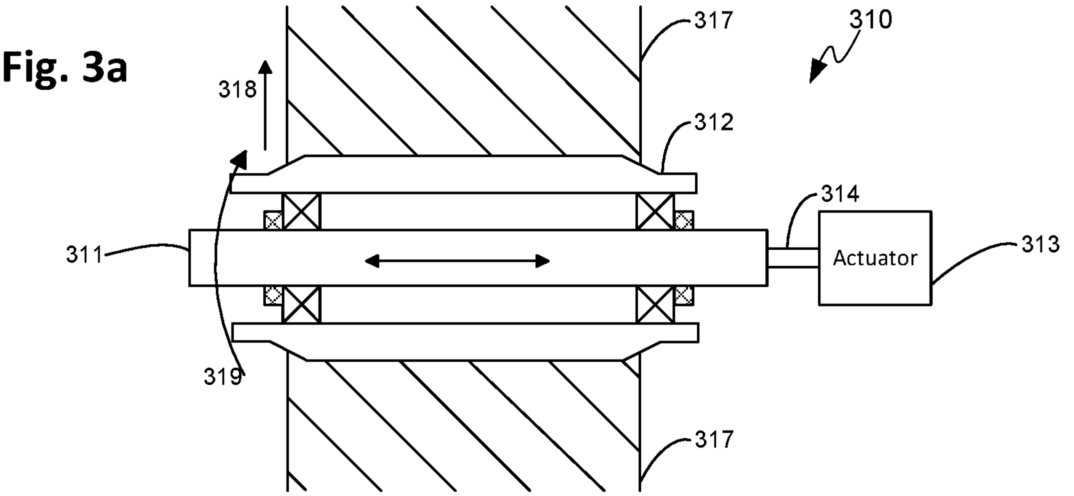
Figure 3B:
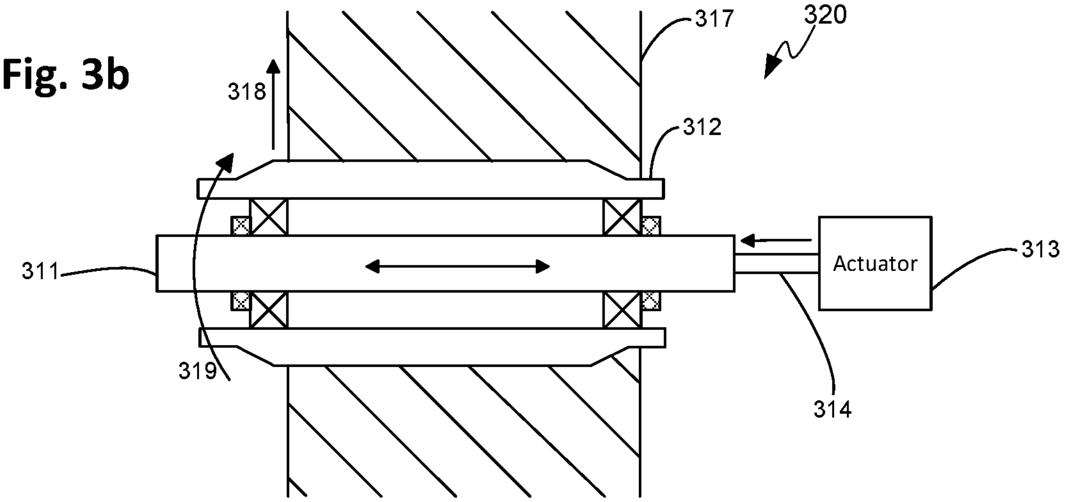
Figure 3C:
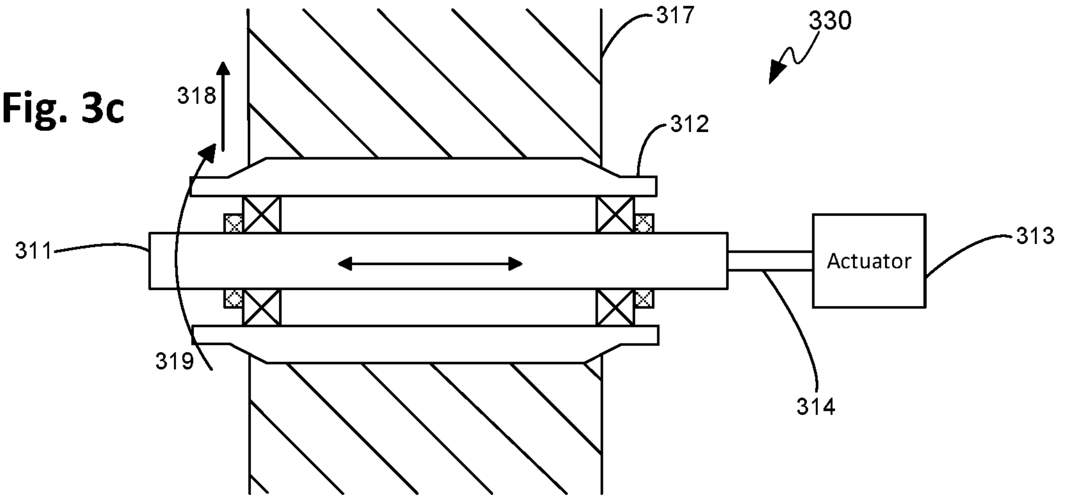
Figure 4:
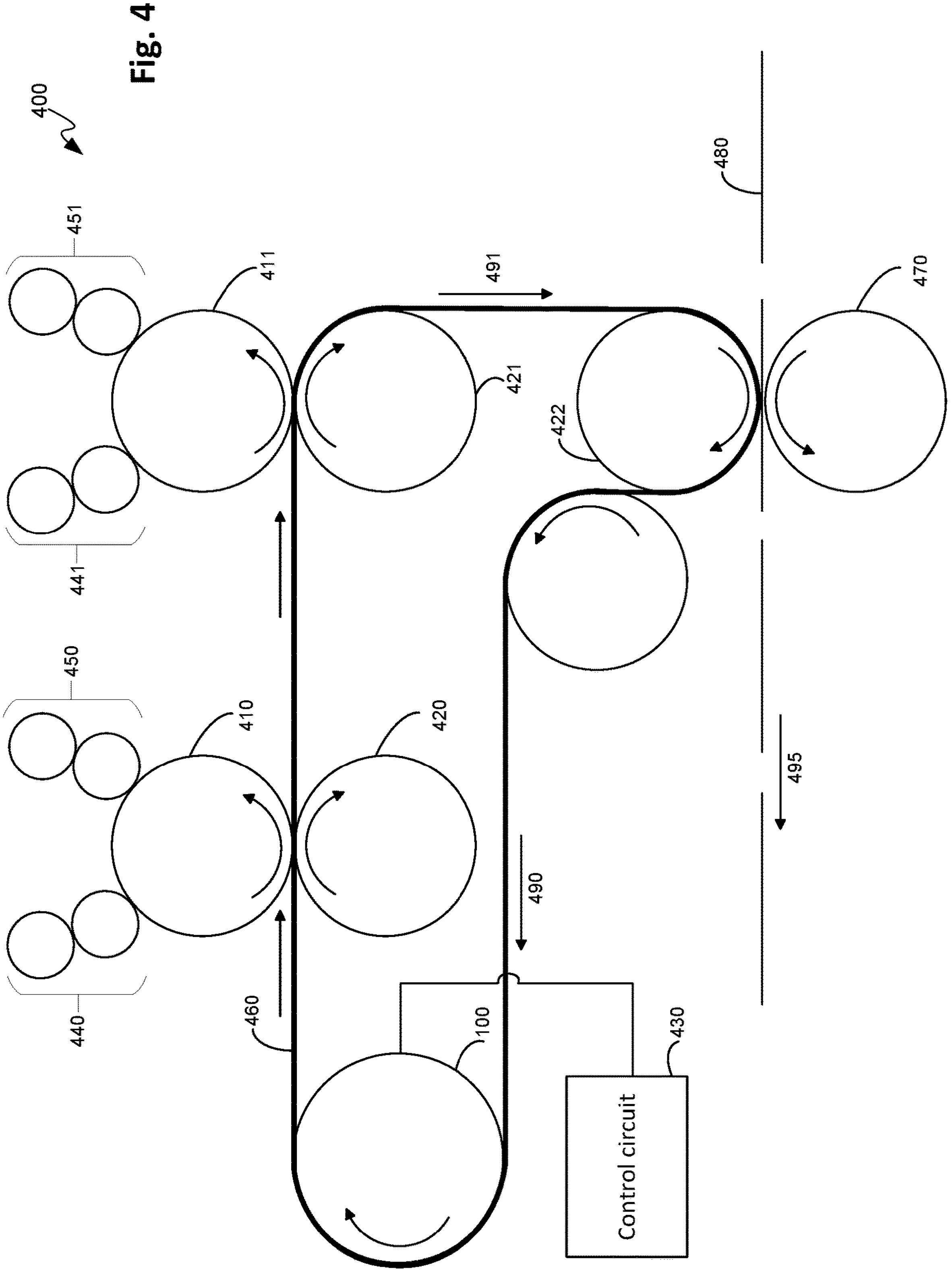
Figure 5:
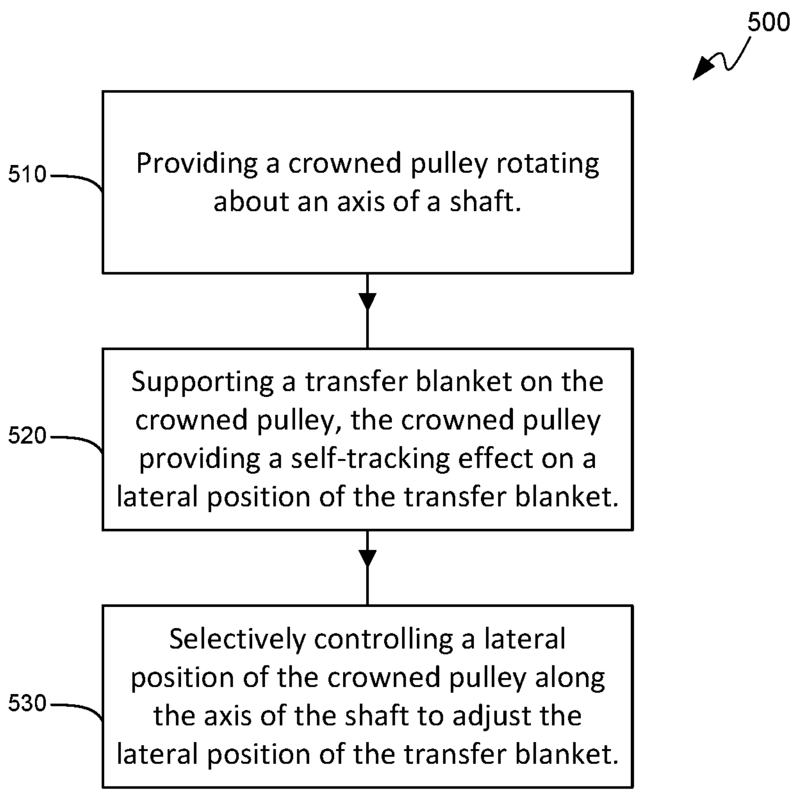
Figure 6:
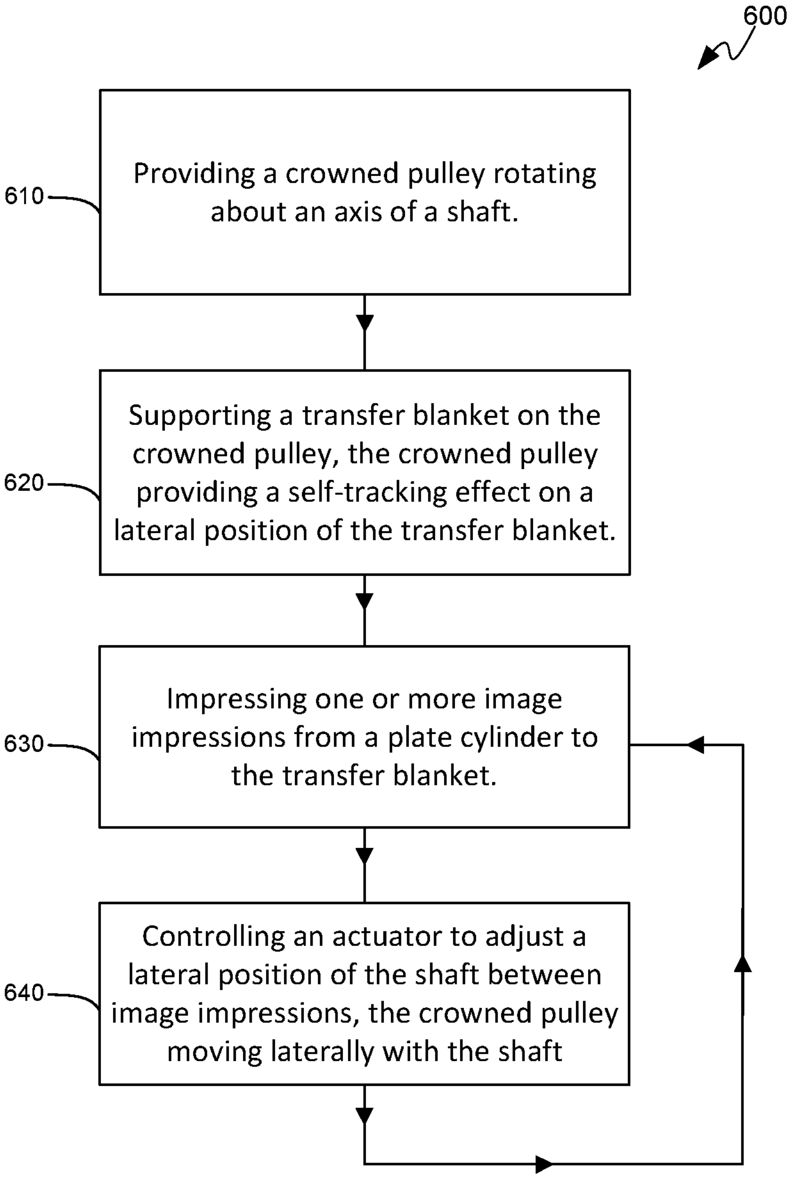

FIGS. 3*a-c* illustrate operation of the system of FIG. 1 according to examples of the disclosure;

FIG. 4 illustrates an image forming system comprising an apparatus providing selective control of a transfer blanket;

FIG. 5 illustrates a flow diagram comprising a first method of adjusting a lateral position of a transfer blanket in an image forming system; and FIG. 6 illustrates a flow diagram comprising a second method of adjusting a lateral position of a transfer blanket in an image forming system.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Offset printing apparatus may be particularly suited to economically producing large volumes of printed materials, such as newspapers, magazines etc. However, constant repetition of the same printed page or image, transferred to the same portion of a transfer blanket can cause that print image to be ingrained in the blanket in what may be described as blanket memory effect.

One way to avoid or reduce this blanket memory effect is to use steering and displacement guides to adjust a lateral position of the transfer blanket in order to avoid repetition of the same printed page or image transferred to a particular portion of the transfer belt. However, these techniques may lead to twist and bend forces to be applied to the blanket causing stress and wear and may lead to stretching the image and reduced print quality. Furthermore, at high steering angles, the blanket can slip.

In order to control the lateral position of the transfer blanket using steering and displacement guides, edge sensors are provided to sense the blanket edge location in order to detect the extent of the steering to be applied. However, accurate detection of the blanket edge position may be difficult due to manufacturing tolerances of the blanket and reading error of edge sensors. Furthermore, twists and bends in the blanket caused by the steering mechanisms themselves may provide the edge sensors with volatile readings which may affect any compensatory steering. In addition, inclusion of edge sensors in an offset printing apparatus adds extra cost and complexity to the system and may increase maintenance and calibration requirements.

Pulleys with a cylindrical-conical or a radially crowned form exert a self-tacking effect on a belt running over the pulley, wherein if a belt has a tendency to run to one side, the belt centering forces on that side increase as the contact area increases. Conversely, the centering forces on the opposite side of the pulley decrease. The resultant force may act to direct the belt towards its centered location on the pulley where the centering forces are balanced.

Such a shaped pulley can be used to accurately align the lateral position of the transfer blanket with respect to a plate cylinder in a printing apparatus. However, the crowned pulley may only allow for one position of the transfer belt, centered on the crowned pulley, which may result in a reduction in print quality due to the blanket memory effect.

Certain examples described herein provide methods and devices that use a crowned pulley to align a lateral position of a blanket in an image forming system while allowing lateral adjustment to be affected to avoid or reduce the blanket memory effect, without exerting excess force on the blanket or causing the blanket to bend or slip.

FIG. 1 illustrates a device 100 to guide a transfer blanket and able to provide selective control of a lateral position of the transfer blanket in an offset printing apparatus. In the example shown in FIG. 1, the transfer blanket position control device 100 comprises a shaft 101; a crowned pulley 102 that rotates about an axis 109 of the shaft 101 and an actuator 103 to control a lateral position of the crowned pulley 102 along the axis 109 of the shaft 101.

In some examples, the shaft 101 may be a non-rotating shaft, and the crowned pulley 102 may be mounted to the shaft 101 with one or more bearings 105, 107. The bearings may be held in place by one or more locating elements 106, 108, for example circlips.

In some examples, the actuator 103 may be coupled to the shaft 101, the actuator 103 to control a lateral position of the shaft 101 along the axis 109 of the shaft 101, and wherein the crowned pulley 102 moves laterally with the shaft 101. The actuator 103 may be coupled to the shaft 101 via an actuator stem 104. The described methods and techniques are not limited to these examples, but rather the actuator 103 and stem 104 may include any device able to provide selective control of the lateral position of the crowned pulley 102 and/or shaft 101.

The crowned pulley 102 may comprise a drum having a substantially cylindrical form. The outer surface comprising a flat central portion with tapered portions at either end, the tapered portions having a diameter that reduces from a maximum at the portion adjacent to the central portion. The tapered portions provide a self-tracking effect on a transfer blanket (not shown) such that the transfer blanket tends to center itself when in contact with, and running on, the crowned pulley 102.

In operation, the crowned pulley 102 is in contact with a transfer blanket (not shown). As the transfer blanket runs over the crowned pulley 102 in a direction orthogonal to the axis 109 of the shaft 101, friction may cause the crowned pulley 102 to rotate about the axis 109 of the shaft 101. As the transfer blanket runs over the rotating crowned pulley 102 it tends to center itself on the pulley, accurately aligning a lateral position of the transfer blanket within an offset printing apparatus.

In some examples, the crowned pulley 102 may be driven by a motor (not shown) such that, in operation, the crowned pulley 102 may rotate about the axis 109 of the shaft 101 and may drive the transfer blanket when in contact with the transfer blanket.

In an example of operation, the actuator 103 controls the lateral position of the shaft 101. When the lateral position of the shaft 101 changes, the crowned pulley 102 also moves laterally with the shaft 101. Thus, by controlling the lateral position of the shaft 101, the actuator 103 may control the lateral position of the crowned pulley 102.

Due to the above described self-centering effect provided by the crowned pulley 102 on a transfer belt running on the crowned pulley 102, lateral movement of the crowned pulley 102 induces a substantially identical change in a lateral position of the transfer belt at the crowned pulley 102.

This effect allows the lateral position of the transfer belt to be accurately adjusted, which can be used to avoid or reduce the blanket memory effect by avoiding repeated prints using the same area of the transfer blanket. Furthermore, due to the self-centering effect of the crowned pulley 102, such lateral adjustment can be performed using an open loop control scheme, removing or reducing the reliance on sensors to monitor the position of the transfer blanket.

In some examples, the range of movement of the shaft 101 produced by the actuator 103 may be up to +1-8 mm.

Figure 2:
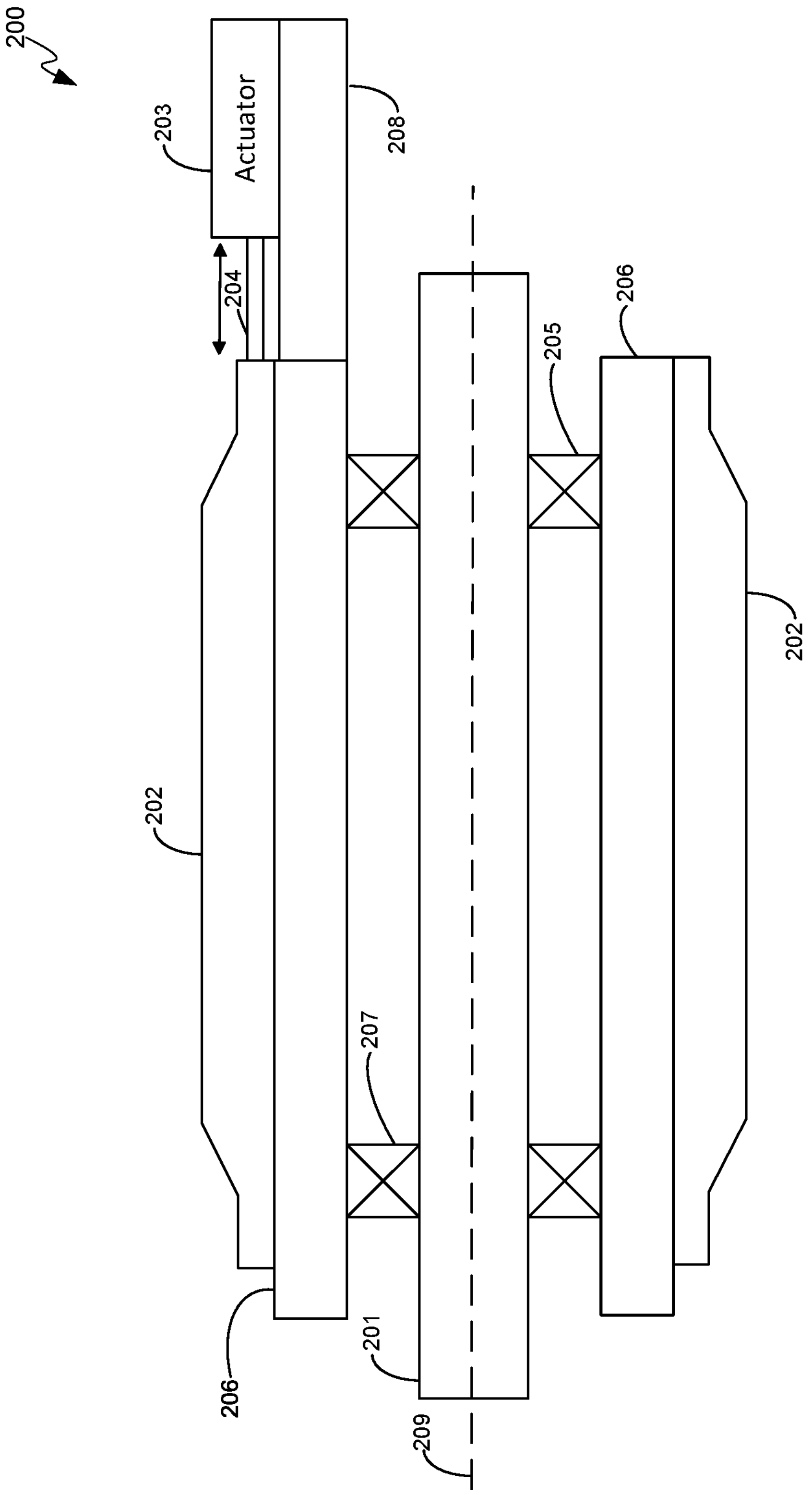
FIG. 2 illustrates a further system to provide selective control of a transfer blanket in an offset printing device according to examples of the disclosure.

FIG. 2 illustrates an alternative device 200 able to provide selective control of a lateral position of a transfer blanket in an offset printing apparatus. In the example shown in FIG. 2, the transfer blanket position control device 200 comprises a shaft 201, similar to the shaft 101 illustrated in FIG. 1; a crowned pulley 202, similar to the crowned pulley 102 illustrated in FIG. 1, to rotate about an axis 209 of the shaft 201; an actuator 203 to control a lateral position of the crowned pulley 202 along the axis 209 of the shaft 201; a drum base 206, the crowned pulley 202 mounted on the drum base 206, the drum base 206 to rotate about the axis 209 of the shaft 201, and the crowned pulley 202 to rotate with the drum base 206.

In some examples, the shaft 201 may be a non-rotating shaft, and the drum base 206 may be mounted to the shaft 201 with one or more bearings 205, 207.

In some examples, the drum base 206 may comprise one or more contact elements (not shown) to cause the crowned pulley 202 to rotate with the drum base 206 and to allow lateral movement of the crowned pulley 202 relative to the drum base 206. These contact elements may include grooves, splines, striations or equivalent.

In the device 200 of FIG. 2, the actuator 203 is coupled between the drum base 206 and the crowned pulley 202, the actuator 203 to control the lateral position of the crowned pulley 202 on the drum base 206.

In some examples, an actuator stem 204 may be coupled between the actuator 203 and the crowned pulley 202. The actuator 203 may be coupled to the drum base 206 via an actuator mount 208.

The described methods and techniques are not limited to these examples, but rather the actuator 203 and actuator stem 204 may include any device providing selective control of the crowned pulley 202.

Similar to the device 100 of FIG. 1, in operation, the crowned pulley 202 is in contact with a transfer blanket (not shown). As the transfer blanket runs over the crowned pulley 202 in a direction orthogonal to the axis 209 of the shaft 201, friction causes the crowned pulley 202 to rotate with the drum base 206 about the axis 209 of the shaft 201. As the transfer blanket runs over the rotating crowned pulley 202 it tends to center itself on the pulley 202, accurately aligning a lateral position of the transfer blanket within an offset printing apparatus.

In some examples, the drum base 206, or the crowned pulley 202, may be driven by a motor (not shown) such that, in operation, the drum base 206 and the crowned pulley 202 may rotate about the axis 209 of the shaft 201 and may drive a transfer blanket when in contact with the transfer blanket.

The actuator 203, actuator stem 204 and actuator mount 208 may rotate along with the crowned pulley 202 and the drum base 206. In some examples, a counter weight (not shown) may be coupled to the drum base 206 and/or crowned pulley 202 on the opposite side of the shaft 201 to the actuator 203, in order to balance the weight and inertia of the actuator 203, actuator mount 208 and actuator stem 204.

In operation, the actuator 203 may control the lateral position of the crowned pulley 202. In response to an actuation of the actuator, the crowned pulley 202, moves laterally relative to the drum base 206. In this example, a lateral position of the the drum base 206 and the shaft 201 relative to other components of an offset printing apparatus may be fixed.

Due to the above described self-centering effect provided by the crowned pulley 102 on the transfer blanket running on the crowned pulley 102, lateral movement of the crowned pulley 102 induces a substantially identical change in the lateral position of the transfer belt at the crowned pulley 102.

This effect allows the lateral position of the transfer belt to be accurately adjusted, which can be used to avoid or reduce the blanket memory effect by avoiding repeated prints using the same area of the transfer blanket. Furthermore, due to the self-centering effect of the crowned pulley 102, such lateral adjustment can be performed using an open loop control scheme, removing or reducing the reliance on sensors to monitor the position of the transfer blanket.

In some examples, the range of movement of the crowned pulley 202 produced by the actuator 203 may be up to +/−8 mm.

FIG. **3*a* illustrates a first instance 310, of the device 100 of FIG. 1 in operation and in contact with a transfer blanket 317. FIG. 3*a* may show the device 100 of FIG. 1 in operation in an offset printing apparatus. The crowned pulley 312 rotates clockwise when viewed from the actuator 313, as shown by arrow 319, and the transfer blanket 317 moves over the crowned pulley 312 in the direction shown by arrow 318. The transfer belt 317 is centered on the crowned pulley 312, and therefore laterally aligned in the offset printing apparatus, due to the self-centering effect of the crowned pulley 312**.

FIG. **3*b* illustrates a second instance 320 which is a continuation from the first instance 310. In this second instance, under control of the actuator 313, a lateral position of the shaft 311 has been adjusted, for example by extending an actuator stem 314, thus causing the shaft 311 and the crowned pulley 312 to move laterally away from the actuator 313. A lateral position of the transfer blanket 317 may temporarily retain its previous alignment in the offset printing apparatus, becoming decentered on the crowned pulley 312. As the transfer blanket is no longer centered on the crowned pulley 312, a net centering force is applied to the transfer blanket 317 as it runs over the crowned pulley 312**.

FIG. 3*c* illustrates a third instance 330 which is a continuation on the second instance 320. Due to the self-centering effect of the crowned pulley, the transfer blanket 317 re-aligns itself on the crowned pulley 312 at the laterally adjusted position of the crowned pulley 312. Thus, the lateral position of the transfer blanket 317 may be easily controlled by adjusting the position of the crowned pulley 312 and without requiring detection of the position of the transfer blanket 317.

Thus, in summary, the self-centering effect of the crowned pulley 312 causes the transfer blanket 317 to automatically track a lateral position of the crowned pulley 312. In this way, control of the lateral position of the shaft 311 allows adjustment of the lateral position of the transfer blanket 317.

FIG. 4 illustrates an example image forming system 400 including the device 100 of FIG. 1, a transfer blanket 460 in contact with a crowned pulley 102 of device 100, and a control circuit 430 to provide a control signal to an actuator 103 of device 100, wherein the actuator 103 is to control a lateral position of the crowned pulley 102 along an axis 109 of a shaft 101 of device 100.

The image forming system 400 may comprise one or more plate cylinders 410, 411, wherein the actuator 103 is to control the lateral position of the crowned pulley 102 such that a lateral position of the transfer blanket 460 is adjusted relative to the one or more plate cylinders 410, 411.

The image forming system 400 may further comprise one or more sets of water rollers 440, 441; one or more sets of printing fluid rollers 450, 451; one or more blanket cylinders 420, 421, 422; one or more impression cylinders 470 and a form of print medium 480.

In operation, the transfer blanket 460 may run in the direction shown by arrows 490, 491. The transfer blanket 460 may be driven by any of the cylinders illustrated in FIG. 4 or by an external driving motor (not shown).

The control circuit 430 provides a control signal to the actuator 103 of device 100 such that the actuator selectively controls the lateral position of the crowned pulley 102 of device 100 along the axis 109 of the shaft 101 of device 100 in line with operations illustrated in FIGS. 3*a*-*c* above.

As discussed above, the self-centering effect of the crowned pulley 102 causes the transfer blanket 460 to automatically track the lateral position of the crowned pulley 102. Thus, as the transfer blanket 460 moves through the image forming system 400, the lateral position of the transfer blanket 460 can be controlled between each set of image impressions made by the one or more plate cylinders 410, 411.

As the transfer blanket 460 passes through the image forming system 400, each color from the set of printing fluid rollers 450, 451 is transferred to a plate cylinder 410, 411 and then impressed onto the transfer blanket 460 creating a build up to a final image color by color. For example, the set of printing fluid rollers 450 may be comprise cyan colored printing fluid and the set of printing fluid rollers 451 may comprise magenta colored printing fluid. The image forming system 400 may comprise further plate cylinders with further sets of water rollers and printing fluid rollers comprising different colored printing fluids, for example yellow and black printing fluid.

As the transfer blanket 460 passes further through image forming system 400 it may come into contact with print medium 480. At this stage in the image forming system 400, the transfer blanket 460 may have the full printed image impressed onto it by the one or more plate cylinders 410, 411 and blanket cylinders 420, 421. As the transfer blanket 460 comes into contact with the print medium 480, the final image is impressed onto the print medium 480 by blanket cylinder 422 and impression cylinder 470. The print medium may move through the image forming system 400 in the direction illustrated by arrow 495.

The control circuit 430 may operate in conjunction with device 100 of FIG. 1 to adjust the lateral position of the transfer blanket 460 between each set of print impressions made by the one or more plate cylinders 410, 411. In this case, each set of print impressions may be transferred to a different portion of the transfer blanket 460, thus reducing blanket memory effects that arise from repeated prints.

FIG. 5 illustrates a method 500 of adjusting a lateral position of a transfer blanket in an offset printing device. For example, using a device 100, 200 as illustrated in FIGS. 1 and 2. According to the method of FIG. 5, a crowned pulley is provided rotating about an axis of a shaft. A transfer blanket is supported on the crowned pulley, the crowned pulley providing a self-tracking effect on a lateral position of the transfer blanket. A lateral position of the crowned pulley along the axis of the shaft is then selectively controlled to adjust the lateral position of the transfer blanket.

The lateral position of the crowned pulley may be controlled by an actuator in response to a control signal.

FIG. 6 shows a further method 600 of adjusting a lateral position of a transfer blanket in an offset printing device. For example, using a device 100, 200 as illustrated in FIGS. 1 and 2. According to the method of FIG. 6, a crowned pulley is provided rotating about an axis of a shaft. A transfer blanket is supported on the crowned pulley, the crowned pulley providing a self-tracking effect on a lateral position of the transfer blanket. One or more image impressions are impressed from a plate cylinder onto the transfer blanket. A lateral position of the shaft is then adjusted between image impressions with the crowned pulley moving laterally with the shaft. The method 600 then continues with further adjustment of the lateral position of the crowned pulley between further image impressions made to the transfer blanket.

All of the features disclosed in this specification (including any accompanying claims, abstract, and drawings) may be combined in any combination, except combinations where some of such features are mutually exclusive. Each feature disclosed in this specification, including any accompanying claims, abstract, and drawings, may be replaced by alternative features serving the same, equivalent, or similar purpose, unless expressly stated otherwise. Thus, unless expressly stated otherwise, each feature disclosed is one example of a generic series of equivalent or similar features.

The present teachings are not restricted to the details of any foregoing examples. Any novel combination of the features disclosed in this specification (including any accompanying claims, abstract, and drawings) may be envisaged. The claims should not be construed to cover merely the foregoing examples, but also any variants that fall within the scope of the claims.

EXAMPLES

According to example 1, there is provided an apparatus comprising a shaft; a crowned pulley to rotate about an axis of the shaft; and an actuator to control a lateral position of the crowned pulley along the axis of the shaft.

Example 2, there is provided the apparatus of example 1, wherein the shaft is a non-rotating shaft, the crowned pulley is to rotate about the axis of the non-rotating shaft.

Example 3, there is provided the apparatus of example 1 or 2, wherein the crowned pulley is mounted to the non-rotating shaft with one or more bearings.

Example 4, there is provided the apparatus of any of examples 1 to 3, wherein the actuator is coupled to the non-rotating shaft, the actuator to control a lateral position of the non-rotating shaft along the axis, and wherein the crowned pulley moves laterally with the non-rotating shaft.

Example 5, there is provided the apparatus of any of examples 1 to 4, further comprising a drum base, the crowned pulley mounted on the drum base, the drum base to rotate about the axis of the non-rotating shaft, and the crowned pulley to rotate with the drum base.

Example 6, there is provided the apparatus of any of examples 1 to 5, wherein the drum base further comprises one or more contact elements to cause the crowned pulley to rotate with the drum base and to allow lateral movement of the crowned pulley relative to the drum base.

Example 7, there is provided the apparatus of any of examples 1 to 6, wherein the actuator is coupled between the drum base and the crowned pulley, the actuator to control the lateral position of the crowned pulley on the drum base.

According to example 8, there is provided an image forming system comprising a shaft; a crowned pulley mounted on the shaft and to rotate about an axis of the shaft; an actuator; a transfer blanket in contact with the crowned pulley; and a control circuit to provide a control signal to the actuator; wherein the actuator is to control a lateral position of the crowned pulley along the axis of the shaft based on the control signal.

Example 9, there is provided the image forming system of example 8, further comprising a plate cylinder, wherein the actuator is to control the lateral position of the crowned pulley such that a lateral position of the transfer blanket is adjusted relative to the plate cylinder.

According to example 10, there is provided a method of adjusting a lateral position of a transfer blanket in an offset printing device, the method comprising: providing a crowned pulley rotating about an axis of a shaft, the crowned pulley providing a self-tracking effect on a lateral position of the transfer blanket; and selectively controlling a lateral position of the crowned pulley along the axis of the shaft.

Example 11, there is provided the method of example 10, wherein selectively controlling a lateral position of the crowned pulley further comprises: controlling an actuator to adjust the lateral position of the shaft, the crowned pulley moving laterally with the shaft.

Example 12, there is provided the method of example 10 or 11, wherein selectively controlling a lateral position of the crowned pulley further comprises: controlling an actuator to adjust the lateral position of the crowned pulley, the crowned pulley mounted on a drum base, the drum base to rotate around the axis of the shaft, and the crowned pulley to rotate with the drum base.

Example 13, there is provided the method of any of examples 10 to 12, wherein the crowned pulley moves laterally on one or more contact elements of the drum base, the one or more contact elements to cause the crowned pulley to rotate with the drum base and to allow lateral movement of the crowned pulley relative to the drum base.

Example 14, there is provided the method of any of examples 10 to 13, further comprising impressing one or more image impressions from a plate cylinder to the transfer blanket; and selectively controlling the lateral position of the crowned pulley along the axis of the shaft such that the lateral position of the crowned pulley is adjusted relative to the plate cylinder between image impressions.

Example 15, there is provided the method of any of examples 10 to 14, wherein the adjustment of the lateral position of the crowned pulley is up to +1-8 mm.

The invention claimed is:

1. An apparatus to adjust a lateral position of a transfer blanket, comprising:

a shaft;

a crowned pulley to rotate about an axis of the shaft;

an actuator to control a lateral position of the crowned pulley along the axis of the shaft; and a drum base, wherein the crowned pulley mounted on the drum base, the drum base rotates about the axis of the shaft, wherein the drum base comprises one or more contact elements to cause the crowned pulley to rotate with the drum base and to allow lateral movement of the crowned pulley relative to the drum base, wherein the actuator coupled between the crowned pulley and the drum base controls the lateral position of the crowned pulley relative to the drum base.

2. The apparatus of claim 1, wherein the shaft is a non-rotating shaft, the crowned pulley to rotate about the axis of the non-rotating shaft.

3. A method of adjusting a lateral position of a transfer blanket in an offset printing device, the method comprising:

providing a crowned pulley rotating about an axis of a shaft, the crowned pulley providing a self-tracking effect on a lateral position of the transfer blanket;

selectively controlling a lateral position of the crowned pulley along the axis of the shaft; and providing a drum base, wherein the crowned pulley is mounted on the drum base, the drum base rotating about the axis of the shaft, wherein the drum base comprises one or more contact elements to cause the crowned pulley to rotate with the drum base and to allow lateral movement of the crowned pulley relative to the drum base, wherein selectively controlling the lateral position of the crowned pulley further comprises:

controlling an actuator that is coupled between the crowned pulley and the drum base to adjust the lateral position of the crowned pulley relative to the drum base.

4. The method of claim 3, further comprising:

impressing one or more image impressions from a plate cylinder to the transfer blanket; and selectively controlling the lateral position of the crowned pulley along the axis of the shaft such that the lateral position of the crowned pulley is adjusted relative to the plate cylinder between image impressions.

5. The method of claim 4, wherein the adjustment of the lateral position of the crowned pulley is up to +/−8 mm.

* * * * *